2,901,506
PYROLYSIS OF SUBSTITUTED CARBONYLOXY-ALKYL HALIDES

Milon W. Bullock, Pearl River, N.Y., and John J. Hand, New Milford, N.J., assignors to American Cyanamid Company, New York, N.Y., a corporation of Maine No Drawing. Application December 6, 1956
Serial No. 626,781

8 Claims. (Cl. 260—488)

This invention relates to a process for the preparation of substituted olefinic compounds. More particularly, it relates to the pyrolysis of halogen substituted hydrocarbon esters, resulting in compounds having a higher degree of unsaturation.

The prior art describes the preparation of 6,8-dithiooctanoic acid (J.A.C.S. 74, 3455 [1952]). This compound and derivatives thereof have been found useful in the treatment of liver disorders. They are also useful as antioxidants in the preservation of oils, fats, etc., which are subject to oxidation and rancidity.

We have found a process which is capable of preparing olefins which can be used to prepare 6,8-dihydroxyoctanoic acid and derivatives. These latter compounds are directly convertible to 6,8-dithiooctanoic acid and derivatives in accord with the process described in our copending applications, Serial Nos. 626,576, filed December 6, 1956, and 626,581, filed December 6, 1956. Also, 6,8-dihydroxyoctanoic acid can be converted to 6,8-dithiooctanoic acid by the recently published method of Braude et al. (Chemistry and Industry, page 508, 1955).

The process of the present invention is a pyrolysis reaction, in which an organic acid or a halogen acid is removed from a molecule to produce compounds having a greater degree of unsaturation. The starting material for the present process can be a compound having at least one esterified hydroxyl group bound to a carbon atom, which is itself bonded to a carbon atom or atoms, and having at least one halogen atom present. The preferred halogen atoms in the present process are chlorine, bromine, or fluorine. The general process of the present invention can be illustrated by the following equation:

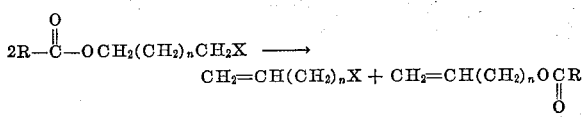

in which R is an alkyl, phenyl, or substituted phenyl radial, X is halogen, and $n$ is an integer.

In the preparation of straight chain compounds, the preferred ester is the acetate and the preferred halogen is chlorine. The reaction is not, however, limited to straight chain compounds, and other examples which are applicable include those of the following table:

TABLE

| Starting Material | Product |
|---|---|
| 4-chlorocyclohexylacetate | 4-chlorocyclohexene |
| 2-acetoxy-(4-chlorophenyl)-propane | 3-(4-chlorophenyl)-propene-2 |
| 4-chloro-3-methylbutylacetate | 4-chloro-3-methylbutene-1 |

The cleavage of tetrahydropyran and tetrahydrofuran with acetyl chloride in the presence of zinc chloride to yield 5-chloroamyl acetate and 4-chlorobutyl acetate respectively can be carried out in the conventional manner. It has been found that the yield of 4-chlorobutyl acetate is greatly improved if cadmium chloride replaces the conventional zinc chloride. It has also been found that it is possible to substitute for the acetyl chloride a mixture of thionyl chloride and acetic anhydride or acetic acid which forms the acetyl chloride in situ and is more economical. The pyrolysis of esters to form olefins has not been employed to prepare compounds other than hydrocarbons and acids. We have found conditions whereby a halogen substituted ester can be pyrolyzed to yield an unsaturated halogen derivative. In preparing compounds of this type it is important to employ the proper catalyst and to carry out the reaction at the proper temperature. We can use catalysts such as glass wool, steel wool, any inert solid having a large surface area, such as Carborundum or kaolin. The preferred catalyst for preparing haloolefins is glass wool, on which a film of carbon has been previously deposited. The carbon film is best formed by passing a small amount of acetic acid through the heated column before the pyrolysis reaction has started. When steel wool is employed, there is a large increase in the amount of unsaturated ester formed during the pyrolysis and a corresponding drop in the yield of the haloolefin. By proper choice of catalysts, it is then possible to prepare predominantly either the unsaturated ester or the unsaturated alkyl halide, depending upon which is desired. The selection of the halogen effects the yield of the unsaturated ester, the more unstable halides giving the higher yields of unsaturated ester. The reaction can be carried out at temperatures within the range of 250° to 650° C. For primary esters, the reaction begins to proceed at a measurable rate at about 480° C., and is rapid from 500°–520° C. The reaction continues at higher temperatures, but a poorer quality product is obtained. Secondary and tertiary alcohol esters can be pyrolyzed at lower temperatures. The secondary alcohol esters are pyrolzed at temperatures as low as 450° C. and tertiary alcohol esters can be pyrolzed at temperatures as low as 250° C. Although it is not necessary for the operation of this invention, we prefer to use an apparatus which continuously recycles unreacted starting material and enables removal of the olefin as rapidly as it is formed. This avoids a long exposure of the olefin to the hot carbon catalyst, which causes a slight amount of rearrangement of the double bond. Furthermore, it makes it practical to obtain a good yield based on starting material.

The following examples illustrate in detail the process of the present invention:

Example 1

A mixture of 1 kg. (11.6 moles) tetrahydropyran, 1 kg. (12.7 moles) acetyl chloride, and 5 g. of anhydrous zinc chloride was refluxed until the temperature of the reaction mixture was 147° C. (7.5 hours). The cooled solution was filtered through a layer of diatomaceous earth filtering aid to remove a small amount of suspended solid and distilled. The product, 5-chloro-1-acetoxypentane, distilled at 93°–97° C. at 7.5 mm. and had $n_D^{20}$ 1.4380. The yield was 1,691 g. (10.3 moles), 89%.

A total of 1554 g. (9.45 moles) of 5-chloro-1-acetoxypentane was pyrclyzed over glass wool packing in a glass tube at a temperature of 500°–520° C. over a period of eight hours. The pyrolyzed distillate weighed 1,326 g. The distillate was poured into water and left standing overnight. Ether was added and the organic phase removed. The ether extract was washed with water and then dried with sodium bicarbonate solution. The ether solution was dried over sodium sulfate and the solvent evaporated. The residue was distilled through a 12" glass helices packed fractionating column. A small forerun, 37.1 g. distilling 50°–98° C. was discarded. The products were collected in two fractions. The first fraction consisting primarily of 5-chloropentene-1 was collected from 98°–110° C. and amounted to 482.6 g. The second fraction consisting primarily of 4-pentene-1-ol acetate was collected from 110°–150° C. This fraction weighed 103 g. The 5-chloropentene-1 fraction was redistilled through the same column to yield 474.6 g. (4.55 moles) 48.2% of pure product, boiling point 104°–105° C. and having $n_D^{20}$ 1.4300, $d^{20}$ 0.901.

Analysis.—Calc'd. for $C_5H_9Cl$: C, 57.42; H, 8.67; Cl, 33.90. Found: C, 57.24; H, 8.76; Cl, 33.70.

The 4-pentene-1-ol acetate fraction on redistillation gave 68.7 g. (0.537 mole), 5.7% of pure ester, boiling point 147°–149° C., $n_D^{20}$ 1.4190.

Analysis.—Calc'd. for $C_7H_{12}O_2$: C, 65.59; H, 9.44; sap. equiv., 128. Found: C, 64.91; H, 9.84; sap. equiv., 133.

The composition of the cracking products is dependent on the type of packing. A stainless steel tube packed with steel wool gave a 22.9% yield of 5-chloropentene-1 and a 20% yield of 4-pentene-1-ol acetate. The same steel tube packed with glass wool gave 14.9% 5-chloropentene-1 and 27.4% of 4-pentene-1-ol acetate.

Example 2

In a 3-neck, one-liter flask were placed 292.7 g. (3.4 moles) of tetrahydrofuran, about 5 g. of anhydrous zinc chloride, and 228 g. (3.8 moles) of glacial acetic acid. Five hundred grams (4.2 moles) of thionyl chloride was added through a dropping funnel. The mixture was then swirled and set aside overnight. The reaction mixture was protected from the atmosphere by a drying tube. It was then refluxed until the temperature in the flask was 150° C. and then allowed to cool. Crude product was clarified by filtering through a layer of diatomaceous earth and distilled, the friction boiling between 97°–105° C. being collected as product. It weighed 364.9 g. Upon redistilling, there was obtained 321.3 g. of product (4-chlorobutyl acetate) distilling at 103°–105° C.

A quantity of 1840 g. (12.2 moles) of 4-chlorobutyl acetate was pyrolyzed over glass wool packing in a glass tube at 500°–520° C. over a period of about eight hours. The pyrolyzed distillate, which weighed 1621 g., was divided in half. One-half was worked up in the same manner as described for 5-chloropentene in Example 1 to yield 320 g. (3.54 moles), 58%, of pure 4-chlorobutene-1, boiling point 73°–75° C., $n_D^{20}$ 1.4230, $d^{20}$ 0.921. The other half was distilled directly through a 24" glass helices packed column. The fraction distilling 69°–116° C. was collected as product and redistilled through the same column to yield 353.4 g. (3.9 moles), 64%, of pure 4-chlorobutene-1, distilling at 73°–77° C.

Example 3

A mixture of 1100 g. (15.3 moles) tetrahydrofuran, 1100 g. (12.75 moles) acetyl chloride, and 2 g. anhydrous cadmium chloride was warmed gently to initiate the reaction. After the spontaneous reflux subsided (3 hours), heat was applied until the temperature was 147° C. The reaction mixture was distilled and the fraction boiling at 84°–87° C. at 15 mm. collected as product. The yield was 1,505.6 g., 78.4% of 4-chlorobutyl acetate, having $n_D^{20}$ 1.4338. A higher boiling product, 4-(4-chlorobutoxy)-butyl acetate, boiling point 142° at 10 mm. and having $n_D^{20}$ 1.4450 was obtained in low yield.

Analysis.—Calc'd. for $C_{10}H_{19}ClO$: C, 53.59; H, 8.56; Cl, 15.93. Found: C, 53.36; H, 8.77; Cl, 16.84.

We claim:

1. The vapor phase process which comprises pyrolyzing at a temperature of at least 400° C. in the presence of a solid catalyst of the group consisting of porous ceramic and common ferrous metals a compound of the formula

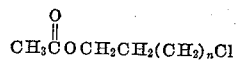

where $n$ is a small integer less than 6.

2. The vapor phase process which comprises plyrolyzing a compound of the formula

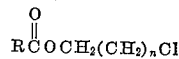

where R is a lower alkyl radical and $n$ is a small integer less than 6 over a solid catalyst, porous ceramic, to yield predominately compounds having the formula $CH_2=CH(CH_2)_nCl$ in which $n$ is as defined above.

3. The process according to claim 2 in which the catalyst steel wool yields predominantly compounds of the formula

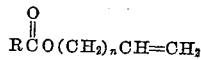

in which R is a lower alkyl radical and $n$ is an integer less than 6.

4. The vapor phase process which comprises pyrolyzing 5-chloroamyl acetate at a temperature within the range of 250° to 650° C. in the presence of glass wool to yield predominantly 5-chloropentene-1.

5. The vapor phase process which comprises pyrolyzing 5-chloroamyl acetate at a temperature within the range of 250°–650° C. in the presence of steel wool to yield predominantly 4-pentenyl acetate.

6. The vapor phase process which comprises pyrolyzing 4-chlorobutyl acetate at a temperature within the range 480°–520° C. in the presence of glass wool to yield predominantly 4-chorobutene-1.

7. The vapor phase process which comprises pyrolyzing 4-chlorobutyl acetate at a temperature within the range of 480°–520° C. in the presence of steel wool to yield predominantly 3-butenyl acetate.

8. In a process of preparing 4-chlorobutene-1 and 3-butenyl acetate the step which comprises reacting tetrahydrofuran with acetyl chloride in the presence of catalytic amounts of cadmium choride and recovering 4-chlorobutyl acetate thereform.

References Cited in the file of this patent

UNITED STATES PATENTS

| 2,314,454 | Manchen et al. | Mar. 23, 1943 |
| 2,388,440 | Rehberg et al. | Nov. 6, 1945 |
| 2,430,897 | Van Atta et al. | Nov. 18, 1947 |
| 2,576,268 | Shugar et al. | Nov. 27, 1951 |

OTHER REFERENCES

Paul et al.: Bull. Soc. Chim. (France), vol. 11 (1944), pp. 465–8.

Gryszkiewicz-Trochimowski et al.: Rec. Trav. Chim. 66 (1947), 418.

Synerholm: J. Am. Chem. Soc. 69, 2581–2 (1947).

Fuson: "Advanced Organic Chemistry," 1950, p. 102.